(12) United States Patent
Yan et al.

(10) Patent No.: US 11,904,571 B2
(45) Date of Patent: Feb. 20, 2024

(54) COMPOSITE MATERIAL STRUCTURE AND PROCESSING METHOD THEREOF

(71) Applicant: Fulian Yuzhan Precision Technology Co., Ltd., Shenzhen (CN)

(72) Inventors: Min Yan, Shenzhen (CN); Jiang-Bo Kong, Shenzhen (CN); Jie Wang, Shenzhen (CN); Shao-Wen Liu, Shenzhen (CN); Lei Zhu, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/084,116

(22) Filed: Dec. 19, 2022

(65) Prior Publication Data
US 2023/0202140 A1 Jun. 29, 2023

(30) Foreign Application Priority Data
Dec. 28, 2021 (CN) .......................... 202111629532.8

(51) Int. Cl.
| | |
|---|---|
| *B32B 15/01* | (2006.01) |
| *B32B 3/26* | (2006.01) |
| *B32B 3/30* | (2006.01) |
| *B32B 38/00* | (2006.01) |

(52) U.S. Cl.
CPC ............ *B32B 15/012* (2013.01); *B32B 3/266* (2013.01); *B32B 3/30* (2013.01); *B32B 15/017* (2013.01); *B32B 38/0012* (2013.01); *B32B 2250/02* (2013.01); *B32B 2311/18* (2013.01); *B32B 2311/24* (2013.01); *B32B 2311/30* (2013.01)

(58) Field of Classification Search
None
See application file for complete search history.

(56) References Cited

U.S. PATENT DOCUMENTS

| | | | | |
|---|---|---|---|---|
| 9,211,605 B2* | 12/2015 | Beenken | ................ | B32B 15/20 |
| 11,597,038 B2* | 3/2023 | Doi | ........................ | B23K 26/28 |
| 2019/0047067 A1* | 2/2019 | Ryu | ....................... | B23K 9/007 |

* cited by examiner

*Primary Examiner* — Daniel J. Schleis
(74) *Attorney, Agent, or Firm* — ScienBiziP, P.C.

(57) ABSTRACT

A composite material structure includes a first metal member and a second metal member bonding to the first metal member. A bonding surface is formed therebetween. A first hole is through the first metal member. A circular bonding line is formed at a junction of a wall of the first hole and the bonding surface. A sleeve protrudes from the second metal member into the first hole, and covers the bonding line. A groove indents from the first metal member. The groove has a bottom surface located in the same plane with a top surface of the sleeve. A processing method of the composite material structure is also provided. The sleeve covers the bonding line between the first metal member and the second metal member, which allows the composite material structure to provide an improved sealing performance.

20 Claims, 8 Drawing Sheets

COMPOSITE MATERIAL STRUCTURE AND PROCESSING METHOD THEREOF

CROSS-REFERENCE TO RELATED APPLICATIONS

This application claims priority to China Application No. 202111629532.8, having a filing date of Dec. 28, 2021, filed in China State Intellectual Property Administration, the entire contents of which are hereby incorporate by reference.

FIELD

The subject matter relates to material processing technologies, and more particularly, to a composite material structure and a processing method thereof.

BACKGROUND

In production, it is often necessary to drill holes into the composite material structural members formed by combining multiple and different materials. The holes extend through different materials of the composite components. For example, FIG. 1 shows a composite material structural member 100 including a first component 10 and a second component 20 bonded together, wherein the first component 10 is made of different materials from the second component 20, a bonding surface 101 is formed between the first component 10 and the second component 20. When drilling a first hole 31' through the first component 10 and a second hole 33' through the second component 20, a bonding line 101' will appear at junction of a wall of the first hole 31' and a wall of the second hole 32'. The bonding line 101' is essentially a crack between the first component 10 and the second component 20 due to their different materials. Therefore the existence of the bonding line 101' cannot be canceled or made to disappear. The bonding line 101' affects the appearance of the composite material structural member 100, and it is prone to corrosion due to contact with the external environment, which results in poor sealing performance.

SUMMARY

An objective of the present disclosure is achieved by providing a composite material structure member with bonding line with improved sealing performance.

An aspect of the present disclosure provides a composite material structure, the composite material structure includes a first metal member and a second metal member made of different materials from the first metal member; the first metal member defines a first hole therethrough, the second metal member is bonded to the first metal member, a bonding surface formed between the first metal member and the second metal member, a circular bonding line formed in the bonding surface adjacent to one end of the first hole, the second metal member including a main body; a sleeve is formed on the main body by hot melting, the sleeve defines a second hole therein and surrounds the second hole, and the sleeve extends into the first hole for covering the bonding line.

A further aspect of the present disclosure provides a method of processing a composite material structure, the method includes following steps: providing a first metal member and a second metal member bonded together, a bonding surface formed between the first metal member and the second metal member, the first metal member made of different materials from the second metal member, the second metal member including a main body; drilling a first hole through the first metal member to allow an end of the first hole to reach the bonding surface, a circular bonding line formed in the bonding surface adjacent to one end of the first hole, and exposed from the first hole; processing the main body of the second metal member from the first hole of the first metal member by hot melting to define a second hole and a sleeve surrounding the second hole, and the sleeve extending into the first hole for covering the bonding line.

BRIEF DESCRIPTION OF THE DRAWINGS

Implementations of the present technology will now be described, by way of example only, with reference to the attached figures.

DETAILED DESCRIPTION

Figure 1:
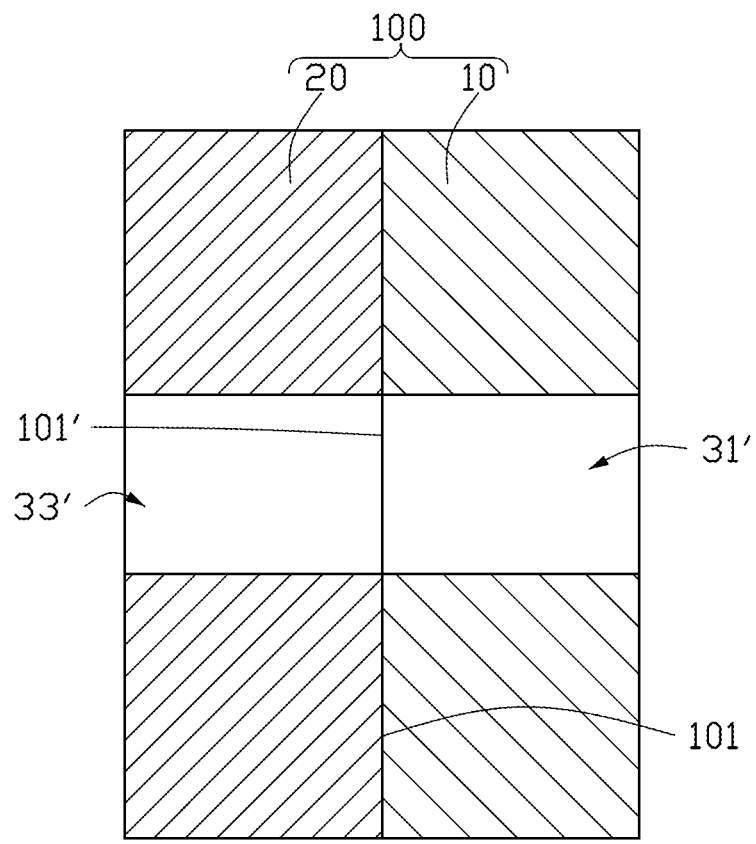
FIG. 1 is a cross-section view of a composite material structure of prior art.
Figure 2:
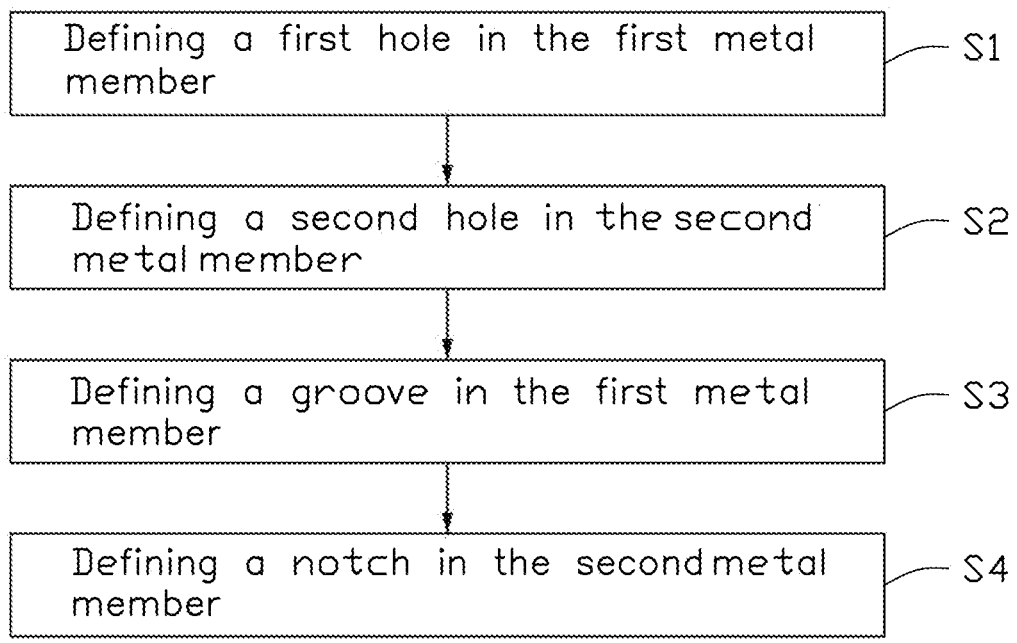
FIG. 2 is a flow diagram of a method of processing a composite material structure according to an embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that the terms "first" and "second" are used to distinguish elements and are not used to denote a particular order or imply a number of technical features, therefore, unless being specifically defined, features described as "first" and "second" may expressly or implicitly include one or more of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

In order to achieve the purpose, a composite material structure and a processing method thereof is provided. The composite material structure includes a first metal member and a second metal member made of different materials from the first metal member; the first metal member defines a first hole therethrough, the second metal member is bonded to the first metal member, a bonding surface formed between the first metal member and the second metal member, a circular bonding line formed in the bonding surface adjacent to one end of the first hole, the second metal member including a main body; a sleeve is formed on the main body by hot melting, the sleeve defines a second hole therein and surrounds the second hole, and the sleeve extends into the first hole for covering the bonding line. The sleeve formed by hot melting covers the bonding line between the first metal member and the second metal member, blocks the gap between the first metal member and the second metal member, and provides improved sealing performance for the composite material structure.

A detailed description of the hereinafter described embodiments of the disclosure is presented herein by way of exemplification and not limitation with reference to the figures.

Figure 3:
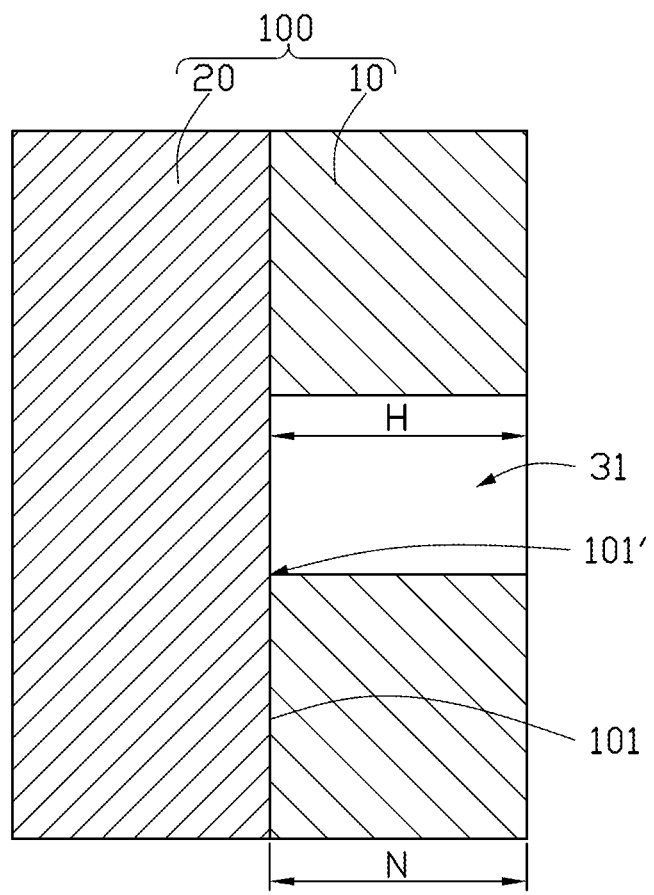
FIG. 3 is a cross-section view of the composite material structure obtained in step S1 of the flow diagram in FIG. 2, according to an embodiment of the present disclosure.

Referring to FIGS. 2-6, a method of machining a hole on a composite material structure is provided according to an embodiment. As shown in FIG. 3, the composite material structure includes a first metal member 10 and a second metal member 20 bonded together, a bonding surface 101 is formed between the first metal member 10 and the second metal member 20, the first metal member 10 is made of different materials from the second metal member 20, the second metal member 20 includes a main body 30. The processing method includes following steps:

Step S1: referring to FIG. 3, drilling a first hole 31 through the first metal member 10, one end of the first hole 31 reaches the bonding surface 101, forming a circular bonding line 101' in the bonding surface 101 adjacent to the one end of the first hole 31, and the bonding line 101' is exposed from the first hole.

Figure 4:
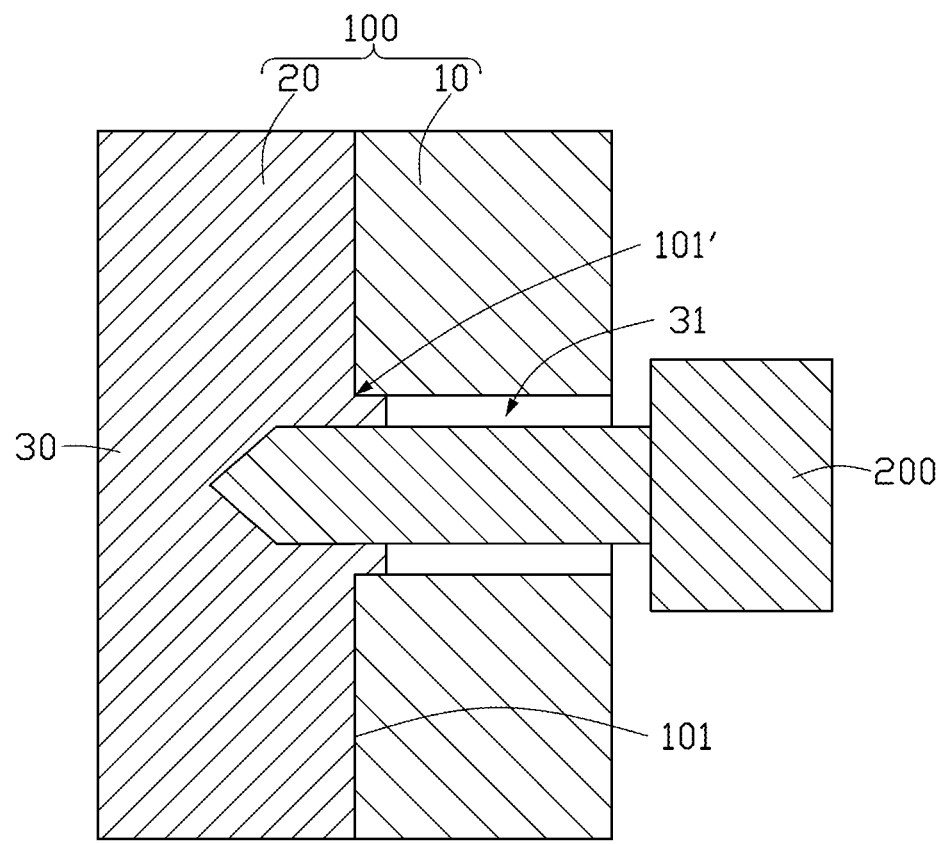
FIG. 4 is a cross-section view of the composite material structure obtained in step S2 of the flow diagram in FIG. 2, according to an embodiment of the present disclosure.
Figure 5:
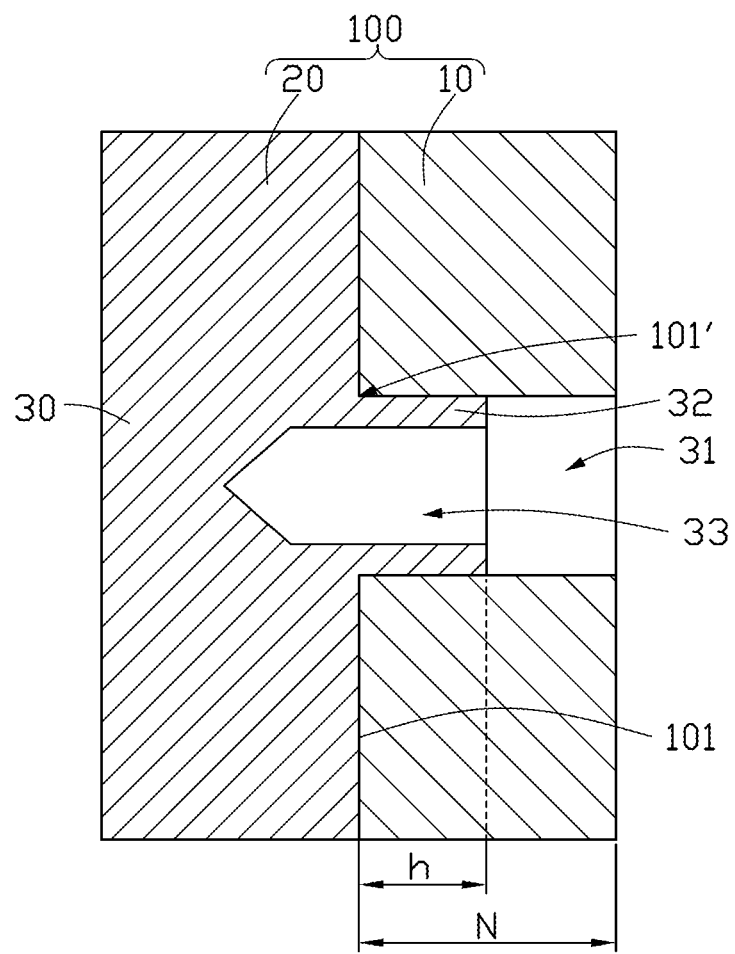
FIG. 5 is a cross-section view of the composite material structure obtained in step S3 of the flow diagram in FIG. 2, according to an embodiment of the present disclosure.

Step S2: defining a second hole in the second metal member by hot melting, referring to FIG. 4 and FIG. 5, the hot melting is performed on a part of the main body 30 of the second metal member 20, the part of the main body 30 of the second metal member 20 is melted for being extruded into the first hole 31, the melted part then solidifies abutting a wall of the first hole 31 and forms a sleeve 32 covering the bonding line 101', the sleeve 32 defines a second hole 33 therein. In this embodiment, the sleeve 32 has a height of h protruding from the second metal member 20.

Therefore, the bonding line 101' can be sealed as the sleeve 32 formed by hot melting is tightly abutting to the wall of the first hole 31, and corrosions or electrochemical reactions at the bonding line 101' that affect the sealing performances and appearance of the composite material structure are avoided. The bonding line 101' of the bonding surface 101 is covered and tightly sealed by the sleeve 32, then the external environment is unable to reach the bonding line 101'.

In this embodiment, a length of the first hole 31 is equal to the thickness of the first metal member 10, and the bonding line 101' appears at a junction of the first hole 31 and the bonding surface 101. It should be noted that, the length of the first hole 31 can be greater than the thickness of the first metal member 10, for example, in further embodiments, the first hole 31 has a length greater than the thickness of the first metal member 10, then part of the first hole 31 is defined by the second metal member 20 and the bonding line 101' appears on the wall of the first hole 31.

Referring to FIG. 3, in further embodiments, the first hole 31 has a length of H, the first metal member 10 has a thickness of N, wherein H=1~1.1*N. For example, the length H of the first hole 31 can be equal to any of N, 1.02*N, 1.05*N, 1.07*N, 1.1*N, and so on. Therefore, the material of the end of first hole 31 is always made of the material of the second metal member 20, allowing the process of the hot melting of the second hole 33 to be performed directly on the second metal member 20, which ensures the purity of the material melt by drilling; on the other hand, the end of the first hole 31 is close enough to the bonding surface 101 for the sleeve 32 to cover the bonding line 101'.

In this embodiment, the second hole 33 is shown as a blind hole that does not penetrate through the second metal member 20, which should not be regarded as a limitation to the application, in a further embodiment, according to actual requirements, the second hole 33 can be a through hole in the second metal member 20.

Figure 6:
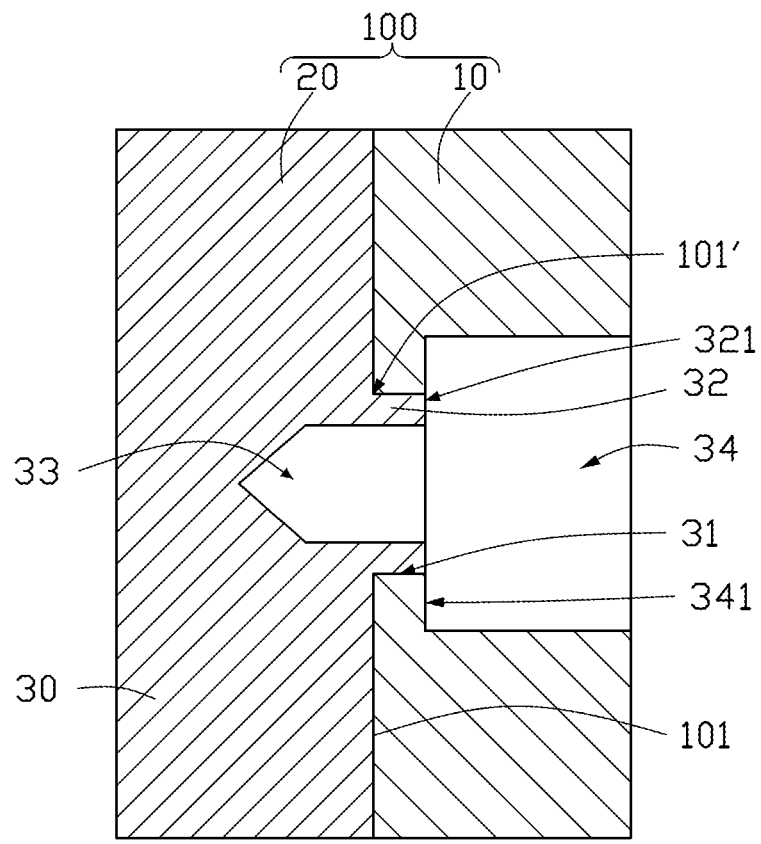
FIG. 6 is a cross-section view of the composite material structure obtained in step S4 of the flow diagram in FIG. 2, according to an embodiment of the present disclosure.

In further embodiments, referring to FIG. 6, the processing method of the composite material structure 100 further includes step S3: machining a groove 34 with a bottom surface 341 on a surface of the second metal member 10 away from the second metal member 20, the bottom surface 341 of the groove 34 is located in the same plane with a top surface 321 of the sleeve 32, then both the second hole 33 and the first hole 31 communicate with the groove 34 at the bottom surface 341 of the groove 34.

Therefore, the top surface 321 of the sleeve 32 can be trimmed flat by the processing of the groove 34, and the height h of sleeve 32 can be shortened.

Figure 7:
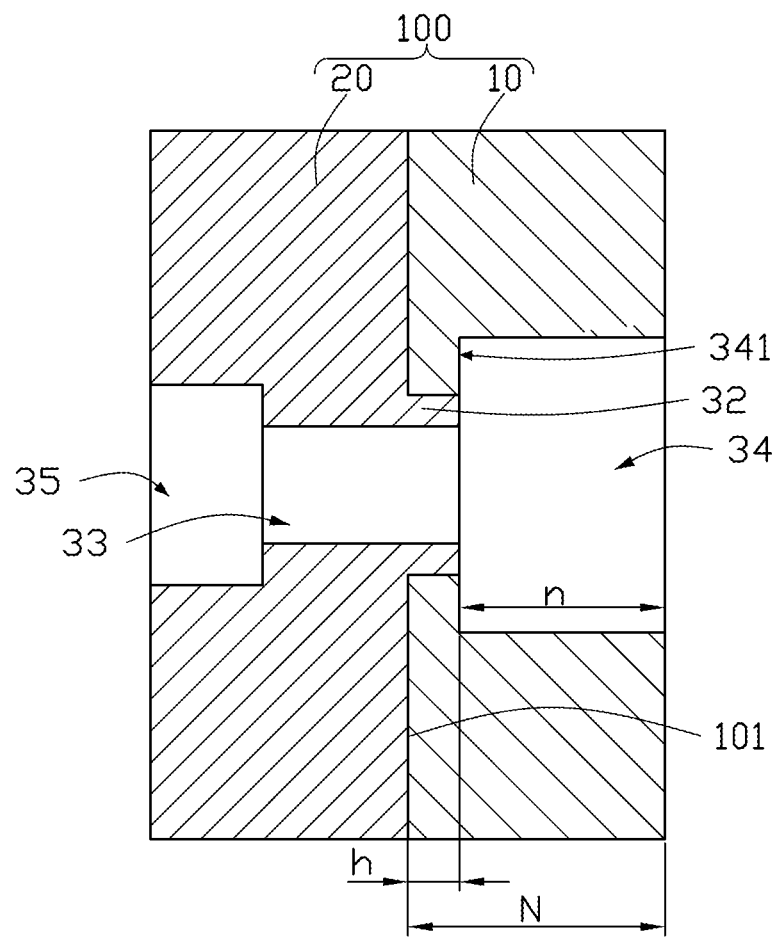
FIG. 7 is a cross-section view of the composite material structure according to an embodiment of the present disclosure.

In further embodiments, referring to FIG. 7, the processing method of the composite material structure 100 further includes step S4: machining a notch 35 in one end of the second metal member 20 opposite to the first metal member 10, the notch 35 communicates with the second hole 33 and the groove 34.

In further embodiments, the first hole 31 is defined by drilling the first metal member 10, the groove 34 is defined by milling the first metal member 10 at the first hole 31 and the sleeve 32, the notch 35 is also formed by milling. When defining the first hole 31, the second hole 33, and the sleeve 32, a drilling process with low precision and high processing speed can be used; when defining the groove 34 and the notch 35, a milling process with high precision is used to trim the wall of the first hole 31 and the top surface 321 of the sleeve 32.

In further embodiments, the bottom surface 341 of the groove 34 of the first metal member 10 is substantially parallel to the bonding surface 101.

In further embodiments, the top surface 321 of the sleeve 32 is surrounded by the bottom surface 341 of the groove 34 of the first metal member 10.

In further embodiments, the first metal member 10 is made of aluminum alloy, the second metal member 20 is made of any of stainless steel, titanium, and titanium alloy. It should be noted that, this should not be regarded as a limitation to the application, in a further embodiment, the first metal member 10 can be made from non-metallic materials such as plastic or rubber, or metal materials such as copper, stainless steel, iron, aluminum, or alloy including one or more of the above metals; the second metal member 20 can be made of any of above mentioned materials as long as it is different from that of the first metal member 10.

In further embodiments, the ratio of the height h of the sleeve 32 to the depth n of the groove is in a range from 1:9 to 3:2.

It should be noted that, the sleeve 32 is formed by performing hot melting on the second metal member 20, therefore the material of the sleeve 32 is same as that of second metal member 20, and the purity is relatively high, which improves the uniformity of strength of the combination of the sleeve 32 and the walls of the first hole 31 or the sleeve 32 and the second hole 33.

Referring to FIG. 7, in further embodiments, the height h of the sleeve 32 is 0.1 to 0.6 times the thickness N of the first metal member 10. For example, the height h of the sleeve 32 is 0.1 times, 0.2 times, 0.3 times, 0.4 times, 0.5 times, 0.6 times, etc., of the thickness N of the first metal member 10, and details are not repeated here. When the height h of the sleeve 32 is within the above range, the sleeve 32 can completely cover and seal the bonding line 101' in the first hole 31 formed by the bonding surface 101 of the first metal member 10 and the second metal member 20 while avoiding the second metal member 20 in a molten state overflowing from the first hole 31.

Referring to FIG. 7, in further embodiments, a composite material structure 100 is provided. The composite material structure 100 includes a first metal member 10 and a second metal member 20 bonded together, the first metal member 10 is made of different materials from the second metal member 20, a bonding surface 101 is formed between the first metal member 10 and the second metal member 20, a first hole 31 is defined through the first metal member 10 and a circular bonding line 101' is formed in the bonding surface 101 adjacent to one end of the first hole 31, the second metal member 20 includes a main body 30 and a sleeve 32 protruding from the main body 30, the sleeve 32 extends into the first hole 31 and covers bonding line 101'. The sleeve 32 is formed by performing the hot melting on a part of the main body 30 of the second metal member 20, the part of the main body 30 of the second metal member 20 is melted for being extruded into the first hole 31, then the melt part of the main body 30 solidifies abutting a wall of the first hole 31 and forms the sleeve 32, the sleeve 32 defines a second hole 33 therein. The composite material structure 100 further includes a groove 34 with a bottom surface 341, the groove 34 communicates with the first hole 31, and the second hole 33, the bottom surface 341 is located in the same plane with a top surface 321 of the sleeve 32.

In a further embodiment, the first hole 31 can be any of a circular hole, a waisted hole, a square hole, a triangular hole, or other shape of hole, which is not specifically limited herein.

In further embodiments, the sleeve 32 is made from same material as that of second metal member 20 and is formed by performing a hot melting process on the second metal member 20. The sleeve 32 surrounds the wall of the first hole 31 for covering the bonding line 101' in the wall of the first hole 31 to improve the sealing of the wall of the first hole 31.

It should be noted that, the second hole 33 is defined by performing hot melting on the part of the main body 30 of the second metal member 20 in the first hole 31, the part of the main body 30 of the second metal member 20 is extruded into the first hole 31 and solidifies abutting the wall of the first hole 31 to form the sleeve 32. The sleeve 32 is tubular with the second hole 33 defined therein, and the top surface 321 of the sleeve 32 (the opening edge of the second hole 33) can be flat and annular. In other embodiments, the sleeve 32 can have a regular or irregular wavy top surface 321.

In this embodiment, the sleeve 32 formed by the hot melting has an irregular top surface 321, and the top surface 321 of the sleeve 32 can be trimmed flat by the processing of the groove 34 by machining the first metal member 10 and the sleeve 32 on the side of the first metal member 10 away from the second metal member 20. In further embodiments, the groove 34 provides operating space for mounting components such as screws or bolts in the second hole 33 for the first metal member 10.

In further embodiments, the first metal member 10 is made of aluminum alloy, the second metal member 20 is made of stainless steel, the sleeve 32 is formed by extruding the stainless steel of the second metal member 20 into the first hole 31 by hot melting with a hot melt drill 200, therefore the second hole 33 is defined by the sleeve 32 and is connected to the first hole 31. The melting point of the stainless steel is higher than that of the aluminum alloy, and part of the wall of the first hole 31 will be melted when in contact with the molten stainless steel, then the aluminum alloy and the stainless steel solidify again, which process improves bonding strength of the sleeve 32 and the wall of the first hole and improves the sealing performance for the bonding line 101'. In further embodiments, the sleeve 32 can be formed by other means, such as laser welding.

In further embodiments, the second hole 33 can be formed as a blind hole that does not extend through the second metal member 20 or a through hole that does extend through the second metal member 20, which should not be regarded as a limitation to the application. In further embodiment, the second hole 32 can be any one of a circular hole, a waisted hole, a square hole, a triangular hole, or hole with other special shape, which are not specifically limited herein. The second hole 33 has a smaller diameter than the first hole 31 as being machined from the bottom of the first hole 31.

Figure 8:
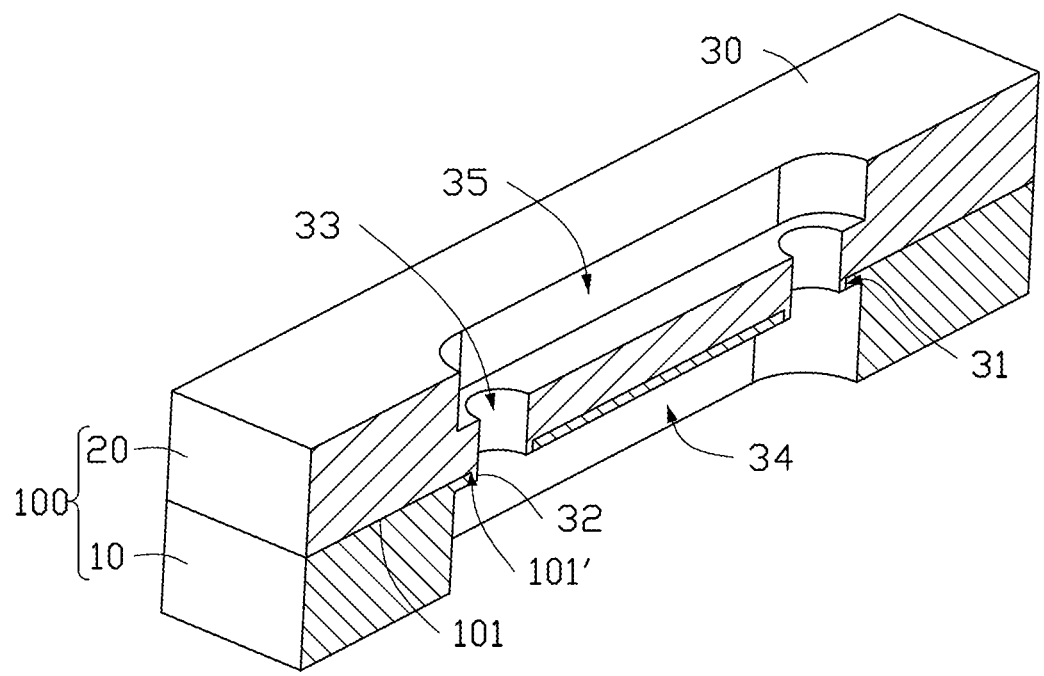
FIG. 8 is a perspective view of the composite material structure according to an embodiment of the present disclosure.

Referring to FIGS. 7-8, in further embodiments, a notch 35 is defined in one end of the second metal member 20 opposite to the first metal member 10, the notch 35 provides room for mounting components to be received in the second hole, the notch 35 communicates with the first hole 31, and the second hole 33. In this embodiment, the sleeve 32 abuts the wall of the first hole 31, then the notch 35 communicates with the first hole 31 via the second hole 33 in the sleeve 32.

In further embodiments, the bottom surface 341 of the groove 34 of the first metal member 10 is substantially parallel to the bonding surface 101.

In further embodiments, the top surface 321 of the sleeve 32 is surrounded by the bottom surface 341 of the groove 34 of the first metal member 10.

In this embodiment, the first metal member 10 is made of aluminum alloy, the second metal member 20 is made of any of stainless steel, titanium, and titanium alloy. It should be noted that, this should not be regarded as a limitation to the application, in a further embodiment, the first metal member 10 can be made from non-metallic materials such as plastic or rubber, or metal materials such as copper, stainless steel, iron, aluminum, or alloy included of one or more of the above metals; the second metal member 20 can be made of any of above mentioned materials as long as it is different from that of the first metal member 10.

In further embodiments, the ratio of the height h of the sleeve 32 to the depth n of the groove is in a range from 1:9 to 3:2. It should be noted that, the composite material structure 100 is shown with two first holes 31 and two second holes 33 for example, in further embodiments, the composite material structure 100 can be arranged with fewer or more first holes 31 and second holes 33, as long as the number of the first holes 31 is equal to the second holes 33. The composite material structure 100 is shown with one groove 34 and one notch 35, each groove communicates with all of the second holes 33 for providing more room. For example, each of the groove 34 and the notch 35 is shaped as a strip, the second holes 33 are arranged at bottom of the groove 34 and the notch 35 along their longitudinal direction for connecting the groove 34 and the notch 35.

Compared with the arrangement of each second hole 33 connecting to one groove 34, the arrangement of one groove 34 communicating with multiple second holes 33 obviously provides larger space and the groove 34 can be processed at one time, therefore, the processing efficiency of the groove 34 can be improved; similarly, the arrangement of one notch 35 communicating with multiple second holes 33 can enlarge the space of the notch 35, and the notch 35 can be processed at one time during processing, therefore, the processing efficiency of the notch 35 can be improved.

In further embodiments, referring to FIG. 7, the groove 34 has a depth n, the first metal member 10 has a thickness N, wherein n<N, which avoids complete milling of the sleeve 32 during processing of the groove 34. In further embodiments, the groove 34 has different depths n at different positions, for example, the depth of the part of the groove 34 away the first hole is not necessarily smaller than that of the first metal member 10, while the depth of the part of the groove 34 in the vicinity of the first hole satisfies: n<N, which can avoid the sleeve 32 being milled completely during processing of the groove 34.

The composite material structure and processing method of the composite material provided by the present invention forms the sleeve 32 in the first hole 31 by hot melting, the sleeve 32 can cover the bonding line 101' formed in the first hole 31 by the bonding surface 101 formed by the first metal member 10 and the second metal member 20, that is the gap between the first metal member 10 and the second metal member 20 in the first hole 31 is blocked, thereby improving air tightness of the hole wall.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A composite material structure comprising:
   a first metal member defining a first hole therethrough; and
   a second metal member bonded to the first metal member, a material of the first metal member being different from a material of the second metal member, a bonding surface being formed between the first metal member and the second metal member, a circular bonding line formed in the bonding surface adjacent to one end of the first hole, the second metal member comprising a main body;
   wherein a sleeve is formed on the main body by hot melting, the sleeve defines a second hole therein and surrounds the second hole, and the sleeve extends into the first hole, the sleeve covers the bonding line.

2. The composite material structure of claim 1, wherein a groove is defined in the first metal member, the groove communicates with the first hole and the second hole, the groove comprises a bottom surface located on a same plane defined by a top surface of the sleeve.

3. The composite material structure of claim 2, wherein a notch is defined in one end of the second metal member opposite to the first metal member, the notch communicates with the second hole and the groove.

4. The composite material structure of claim 2, wherein the bottom surface of the groove is parallel to the bonding surface between the first metal member and the second metal member.

5. The composite material structure of claim 1, wherein the first metal member is made of aluminum alloy.

6. The composite material structure of claim 5, wherein the second metal member is made of one of stainless steel, titanium, and titanium alloy.

7. The composite material structure of claim 2, wherein the ratio of a height of the sleeve to a depth of the groove is in a range from 1:9 to 3:2.

8. A method of processing a composite material structure, the method comprising:
   providing the composite material structure, the composite material structure comprises a first metal member and a second metal member bonded together, wherein a bonding surface is formed between the first metal member and the second metal member, a material of the first metal member is different from a material of the second metal member, the second metal member comprises a main body;
   drilling a first hole through the first metal member so that one end of the first hole reaches the bonding surface, a circular bonding line is formed in the bonding surface adjacent to the one end of the first hole, and the circular bonding line is exposed from the first hole; and
   processing the main body of the second metal member from the first hole of the first metal member by hot melting to define a second hole and a sleeve surrounding the second hole, wherein the sleeve extends into the first hole, and the sleeve covers the bonding line.

9. The method of claim 8 further comprising:
   machining a groove on a surface of the first metal member away from the second metal member, the groove is machined to define a bottom surface located in a same plane defined by a top surface of the sleeve, and the groove communicating with the first hole and the second hole.

10. The method of claim 9, wherein the groove is formed by cutting the first metal member and the sleeve so that the sleeve to have a flat top surface in the groove.

11. The method of claim 10, wherein the bottom surface of the groove in the first metal member is parallel to the bonding surface.

12. The method of claim 8, wherein the first metal member is made of aluminum alloy.

13. The method of claim 9 further comprising:
   machining a notch in one end of the second metal member opposite to the first metal member, the notch communicating with the second hole and the groove.

14. The method of claim 13, wherein the second metal member is made of one of stainless steel, titanium, and titanium alloy.

15. The method of claim 9, wherein the first hole has a length of H, the first metal member has a thickness of N, wherein H=1~1.1*N.

16. The method of claim 10, wherein the ratio of a height of the sleeve to the depth of the groove is in a range from 1:9 to 3:2.

17. A composite material structure comprising:
- a first metal member defining a first hole therethrough; and
- a second metal member bonded to the first metal member, a material of the first metal member being different from a material of the second metal member, the second metal member comprises a main body and a sleeve protruding from the main body, the sleeve extends into the first hole and abuts against an inner wall of the first hole, a second hole is defined by the sleeve, the second hole communicates with the first hole;

wherein the sleeve is formed by processing the main body of the second metal member from the first hole of the first metal member through hot melting.

18. The composite material structure of claim 17, wherein a groove is defined in the first metal member, the groove communicates with the first hole and the second hole, and the groove comprises a bottom surface located on a same plane defined by a top surface of the sleeve.

19. The composite material structure of claim 18, wherein a notch is defined in one end of the second metal member opposite to the first metal member, the notch communicates with the second hole and the groove.

20. The composite material structure of claim 17, wherein the sleeve extends through the first hole, a bonding surface is formed between the first material and the second material, and the bottom surface of the groove is parallel to the bonding surface between the first metal member and the second metal member.

* * * * *